March 14, 1961     C. M. HEATH ET AL     2,975,266
GAS SHIELDED ELECTRIC ARC WELDING
Filed Dec. 30, 1958

INVENTORS
CARLOS M. HEATH
ARTHUR F. AXELSON
BY Barnwell R. King
ATTORNEY

United States Patent Office 2,975,266
Patented Mar. 14, 1961

2,975,266
GAS SHIELDED ELECTRIC ARC WELDING

Carlos M. Heath and Arthur F. Axelson, Kenmore, N.Y., assignors to Union Carbide Corporation, a corporation of New York Filed Dec. 30, 1958, Ser. No. 783,820

8 Claims. (Cl. 219—137)

This invention relates to electric arc welding with the work-in-circuit and, more particularly, to fusion welding metal foil with a gas shielded arc.

The ability to weld very thin foil is becoming increasingly important in such fields as aircraft and cryogenics. In cryogenics work, the new welding techniques permit the use of low heat conductive, vacuum-tight closures between warm and cold walls. Several difficult problems are involved when welding thin materials below 10 mils (0.010 in.) thickness, for example. One of the most difficult is the tendency of the thin material to move due to heat so that its edge cannot be positioned accurately. This is particularly critical in making butt joints.

Of equal or greater importance is the problem of holding thin metal material in continuous firm contact with another member capable of removing considerable heat from the foil adjacent the weld area. If the foil adjacent the weld zone is not cooled sufficiently at all points, it will melt back. When all surfaces involved in the weld and hold-down means are perfectly smooth and flat, it is a relatively simple matter to obtain adequate contact to ensure cooling. However, the normal surface roughness and irregularity encountered in commercially available materials causes considerable trouble. Wrinkling of the thin materials near the welded edge is also common. Such wrinkling is objectionable, and is prohibitive in some cases.

The fine dimensions involved in metal foil welds impose a unique and critical combination of welding conditions. Very small diameter electrodes and low amperages are required, and hold-down bars (conventionally metallic) must be very close to the electrode. These requirements tend to cause arc instability, arc wander, and excessive thermal expansion of the electrode.

Finally, high vacuum service sets a near perfect standard for welds, for even the slightest porosity, crack or pinhole is prohibitive.

The main objects of this invention are to solve such problems.

According to this invention metal foil is fusion-welded by solidly backing the foil in the welding zone with a sheet of highly thermally conductive metal that is, in turn, backed by a sheet composed of silicone rubber, such as dimethylpolysiloxane with a fine silica filler obtainable as Union Carbide compound No. K–1046, and a rigid back-up member. In case the foil to be welded is lapped or butted, the work is held down by spaced means composed of electrically non-conductive material. In any case, such novel solid back-up means enable us to use commercially pure argon gas as the arc shielding medium without staining or otherwise impairing the color of the so-welded foil.

Figure 1:
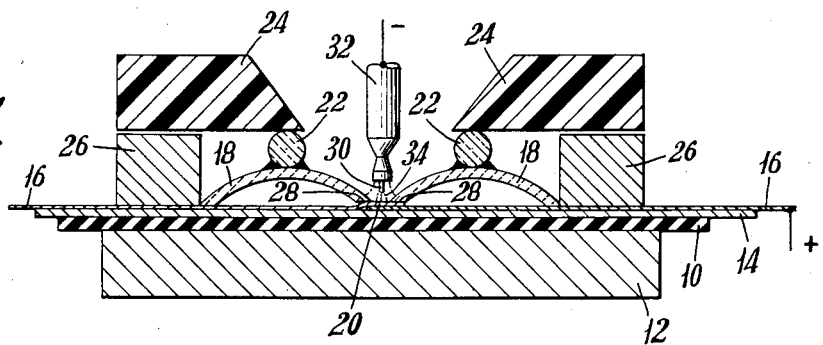
Fig. 1 is a fragmentary view in cross section of a foil-to-foil lap-welding set-up illustrating the invention.

As shown in Fig. 1, a sheet 10 of silicone rubber is placed on a rigid base 12 of steel (cold rolled). A sheet 14 of thin copper (cold rolled and preferably annealed), that is smooth and of uniform gauge, is then placed on the silicone rubber sheet 10. The foil pieces 16, 16 are then placed on such copper sheet 14 with their edges to be welded in overlapping relation, as shown. Arched hold-down members 18, 18, composed of ceramic material, are mounted on the foil 16 in spaced parallel relation adjoining the zone 20 to be welded. Ceramic load distributing rods 22, 22, bonded to the tops of such members 18, 18 are pressed downwardly by clamping members 24, 24, that are prevented from being pressed down too far by spacing members 26, 26.

The inner edges 28, 28 of the arched hold-down members 18, 18 rest on the overlapping sections of the foil to keep the latter in close contact with each other and with the backing members 14, 10, and 12. A D.C.-S.P. argon gas shielded welding arc is struck with high frequency on a start-off plate (not shown) between the work and the fresh end of a small tungsten electrode 30 of an inert gas shielded arc welding torch 32. Upon the establishment of welding arc 34, the torch is moved along a line of the zone to be welded between the hold-down member edges 28, 28, fusing the overlapping foil sections, which upon cooling provides a weld of vacuum quality.

Figure 2:
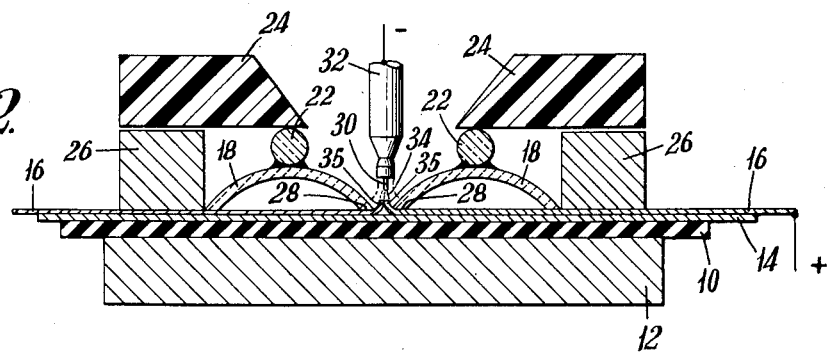
Fig. 2 is a similar view of a foil-to-foil butt-welding set-up.

In Fig. 2 the set-up and operation are similar except that the edges 35, 35 of the foil to be welded are upset in preparation for welding. In operation, such upset edges are melted down forming a butt-weld between the pieces of foil. The copper backing member 14 is thereupon removed from the so-welded foil, leaving a vacuum quality fusion weld between such pieces.

Figure 3:
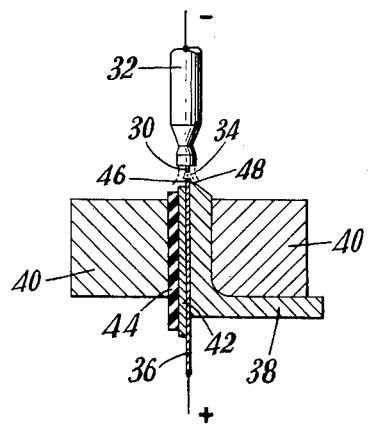
Fig. 3 is a similar view of a foil-to-angle edge welding set-up.

Fig. 3 shows a cross-section of another joint and hold-down, according to the invention, for edge-welding a 2-mil thick stainless steel breaker strip 36 to a 1 inch x 1 in. x ⅛ in. stainless steel angle 38. The 2-mil strip 36 is held against the angle 38 by hold-down bars 40, 40. Pressure of about 500 p.s.i. is distributed throughout the area to be welded by means of a strip of copper 42 and a ¹⁄₁₆-inch strip 44 of silicone rubber. Silicone rubber is used instead of stronger, more common rubbers because the latter will ignite causing welding interference, whereas the silicone rubber will only char. A suitable silicone rubber is exemplified by Union Carbide silicone rubber compound K–1046 having an approximate durometer hardness of 60 and an oxidation temperature of about 625° F.

The strip 42 of copper is placed under the silicone rubber strip 44 to limit the melt-back of the foil 36. The copper strip also serves to apply pressure in the area very near the edge of the weld that is too hot for the silicone rubber. While copper is the only common material suitable for this purpose, others such as silver and gold that do not overheat and fuse because of low thermal conductivity are suitable. The gauge of the copper is rather important for it must be thin enough to conform easily to surface irregularities and must be heavy enough to carry away the heat. Of course, surface finish is of paramount importance and the thickness should be as uniform as possible. Cold rolled annealed copper, 0.018-inch thick, was found suitable for 2-mil stainless steel welds. Due to the fine dimensions involved, exact cutting of the work and precise alignment of work and hold-down components are highly important factors.

Another important factor is the projection 46 of the foil beyond the nose 48 of the angle 38. In the case of 2-mil stainless steel welded to ⅛-inch angle, such projection should be 0.02 to 0.03-inch. Also, the upper surface of nose 48 should be beveled at 30° to 45° to the plane of the working leg of the angle and be provided with a ¹⁄₆₄ to ¹⁄₃₂-inch tip. The copper strip 42 is set back about ¹⁄₃₂-inch below the nose tip and the edge of the silicone rubber strip 44 is set back between 0.062 and 0.090 inch below such nose tip.

Although hand welding, according to the invention, has been successful, the majority of the welding on the cold box breaker strip assembly was done by automatic welding and achieves greater uniformity. Long edge welds (Fig. 3) were made using an accurately guided carriage (screw driven or otherwise) which moved the torch at a selected speed over the work. A pencil-shaped, tungsten electrode, inert gas welding torch was installed on the carriage and was fitted with an .040-inch 1% thoriated tungsten electrode. The following conditions were found to give satisfactory results:

Arc length __ 0.015–0.030 inch.
Gas _____ 20 c.f.m. argon (commercially pure).
Current _____ 25 amp. direct current, straight polarity, with superimposed continuous high frequency.
Speed _____ 14 inches per minute.

Successful joints have been made, according to the invention, with 1- and 2-mil strip against ⅛-inch angle with the above method. Some of these were made over splices in the stainless steel foils. The splices were at right angles to the weld; some splices were resistance-welded while others were inert gas shielded arc welded. Surprisingly, it was not particularly difficult to obtain a satisfactory joint at the weld juncture in spite of slight surface irregularity. This is an exception to the otherwise rigid requirement for firm continuous contact.

In some respects, the butt- and lap-welding of 1- and 2-mil foil is more difficult than the edge-welding of foil to heavier sheet. First, the welding operation is very critical because of the low currents involved. Special controls such as a lamp bank are needed to obtain a steady current in a 1.5–5 amp. range. Second, a very small electrode must be used to maintain current density for arc stability and to concentrate the arc. Third, the gas shield around the electrode required a small, special design in order to stay within the space limitations between the hold-down bars, 0.030–0.040 inch. A roughly rectangular glass cup for the torch was used having inside dimensions of only 0.062 x 0.190 inch. Fourth, satisfactory arc stability is in some cases also benefited by superimposing high frequency continuously. Normally, high frequency is used only to establish the arc, but with such low current value, we found in the case of butted edge-to-edge thin-to-thin foil that the arc tended to skip unless high frequency is maintained on the main direct current welding arc. Fifth, the close proximity of the hold-down bars made it necessary to replace electrically conductive bars (copper) with electrically non-conductive bars. Suitable ceramic bars were designed using sections of quartz or silica tubes. Common glass hold-downs were tried but were not suitable because they spalled under the heat. Sixth, the contour of the bars was special. They should be relieved or beveled upwardly to permit torch insertion and to funnel the arc in place without interference. The bottom of the bar should preferably be concave, or otherwise shaped to concentrate the hold-down pressure close to the weld.

The same carriage and torch arrangement was used in making 1- and 2-mil butt and lap welds as in making the thick-to-thin welds previously described. Other conditions maintained during the 1- and 2-mil welds are:

| | Range of Tests | Selected Successful Test |
|---|---|---|
| Electrode Diameter, in | .020 | .020 |
| Arc Length, inches | .015–.031 | .018 |
| Gas, c.f.m. argon | 4–12 | 6 |
| Current, amp. Direct Current, Straight Polarity, Superimposed High Frequency | 1–5 | 3 |
| Speed, inches per minute | 12–20 | 14 |

Satisfactory butt and lap welds (Figs. 1 and 2) for vacuum service have been made with both 1- and 2-mil stainless steel. We expect that good welds could also be made by this method with materials thinner than 1 mil. However, it appears that the foils thinner than 1 mil (and perhaps including 1 mil), now available on the market, are not sufficiently sound for vacuum service.

Speed appears to be critical in making either thick-to-thin welds (Fig. 3) or thin-to-thin welds (Figs. 1 and 2). Too slow a speed aggravates the tendency of the thin materials to ripple or wrinkle near the weld. Excessive speeds tend to interrupt the weld puddle.

To prove the utility and practicality of these welds, a 1-ft. cube, vacuum-insulated box was constructed using a 2-mil stainless steel breaker strip around the top. A small quantity of "scavenger" material was placed in the insulation space to entrap residual gas adsorbed on and in the walls. Then the space was evacuated to below 1 micron Hg. After twelve months the pressure in the insulation space is still below 1 micron, and the space has not been re-evacuated during this time. (Vacuum measurements were made with the inner container at liquid nitrogen temperature.)

The welds made to date have been principally with 304 stainless steel. This material has been used because it is ideally suited to inert gas shielded arc welding, and its use would minimize miscellaneous welding difficulties until the major problems were solved. Furthermore, stainless steel is of particular interest in cryogenics work because of its low thermal conductivity.

Invar is also of interest and has been lap-welded successfully, according to the invention. This material has lower thermal conductance than stainless steel and at low temperatures exhibits very low coefficients of thermal expansion.

Tests are currently being conducted on an edge-welded joint between 2-mil stainless steel and ⅛-inch thick carbon steel. The type of carbon steel used will probably be important, and best results are expected with the "killed" steels. Ordinary rimmed steels tend to be gassy and might interfere with vacuum tightness, although this effect is minimized in small welds and may not prove to be critical.

Modifications of the hold-down bars and shims are possible to make setup easier and faster. For example, two or all three of the members (bar, rubber, and copper) may be bonded together in the proper relationship.

The method may be adaptable to continuous welding where the work is moved under a stationary torch. In such case, the hold-down assembly might be a wheel or roller having a silicone rubber rim overlaid with a copper sheet or strip.

We claim:

1. Method of fusion welding metal foil which comprises solidly backing the foil to be welded with a sheet of metal of relatively high thermal conductivity which is pressed in surface-to-surface contact therewith by a sheet of silicone rubber that is, in turn, backed by a rigid backing member, striking a straight polarity-direct current welding arc between said foil and a non-consumable electrode in a selected shielding gas, fusing such foil at the zone to be weded with such gas shielded arc, permitting the so-fused metal to cool and solidify, and then separating the backing members including said sheets from the so-welded foil, leaving a gas-tight weld of vacuum quality.

2. Method of fusion welding foil as defined by claim 1, in which foil-to-foil to be welded is held firmly in welding position on such backing sheet of thermally conductive metal during the welding operation by hold-down means composed of electrically non-conductive material spaced apart to provide space therebetween for such electrode.

3. Method of fusion welding foil as defined by claim 1, in which foil is welded to a nose of thicker material by arranging the foil in parallel and direct contact relation with such material opposite such backing sheets, and with the edge of the foil projecting beyond the nose of such material, and so-welding said edge to the tip of such nose.

4. Method of fusion welding metal foil as defined by claim 1, in which the arc shielding is commercially pure argon, characterized in that the color of the foil is not impaired by the process.

5. Method of fusion welding metal foil as defined by claim 4, in which the foil is selected from the class consisting of stainless steel and Invar.

6. Method of fusion welding metal foil as defined in claim 5, in which such foil is at most 0.010 inch thick.

7. A back-up for fusion welding foil with a gas shielded arc which comprises the combination of a sheet of thermally conductive metal in contact with the foil, and a sheet of silicone rubber in direct physical contact with such thermally conductive member.

8. A back-up as defined by claim 7, combined with a foil hold-down comprising electrically non-conductive ceramic material.

References Cited in the file of this patent

UNITED STATES PATENTS

| | | |
|---|---|---|
| 1,566,674 | Horta | Dec. 22, 1925 |
| 2,145,937 | Lockwood | Feb. 7, 1939 |
| 2,254,314 | Reed | Sept. 2, 1941 |
| 2,631,215 | Randall et al. | Mar. 10, 1953 |